E. B. KEITH.
PRESSURE CONTROLLER FOR TIRES.
APPLICATION FILED MAR. 19, 1914.

1,128,455.

Patented Feb. 16, 1915.
4 SHEETS—SHEET 1.

Witnesses:
E. R. Barutt
L. M. Spencer

Inventor
Edward B. Keith
By Edward N. Pagelsen
Atty.

E. B. KEITH.
PRESSURE CONTROLLER FOR TIRES.
APPLICATION FILED MAR. 19, 1914.
1,128,455.
Patented Feb. 16, 1915.
4 SHEETS—SHEET 2.
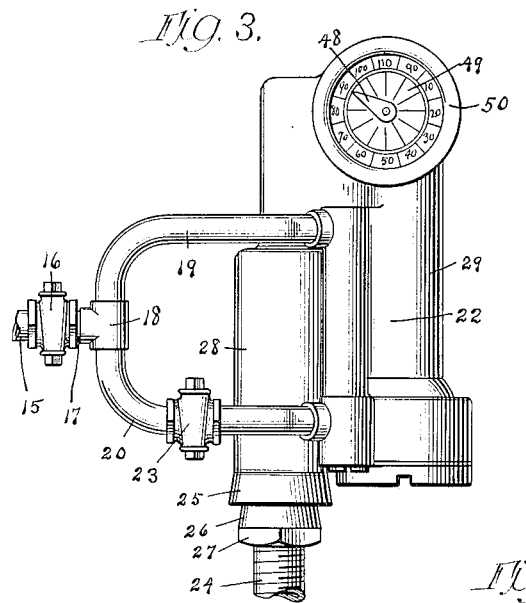
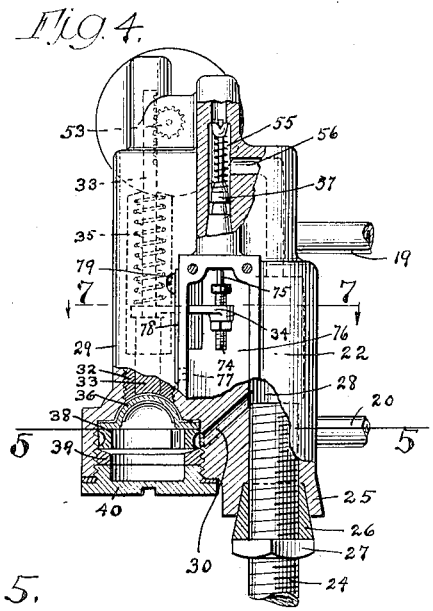
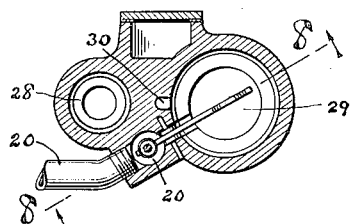
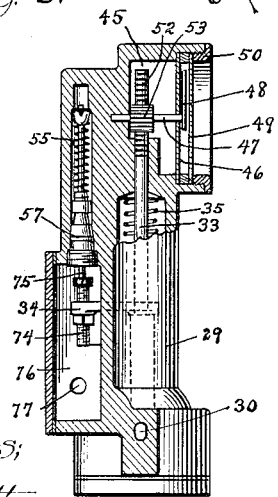
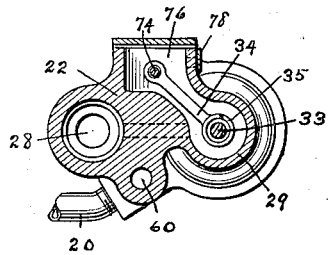
Witnesses:
E. R. Barrett
L. M. Spencer
Inventor
Edward B. Keith
By Edward N. Pagelsen
Atty.

E. B. KEITH.
PRESSURE CONTROLLER FOR TIRES.
APPLICATION FILED MAR. 19, 1914.
1,128,455.
Patented Feb. 16, 1915.
4 SHEETS—SHEET 3.
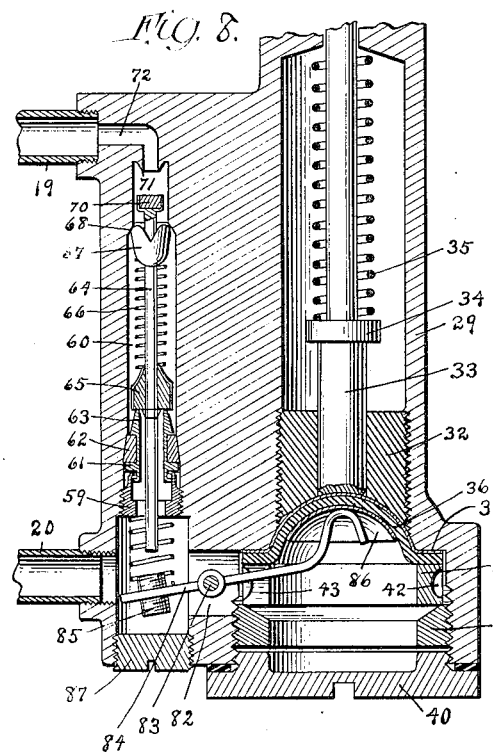
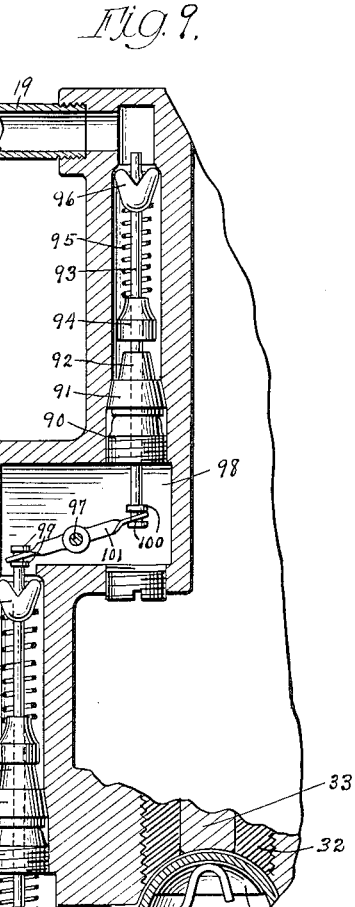
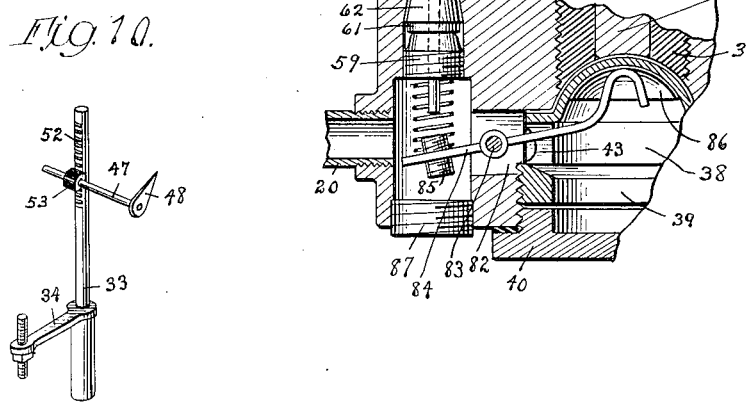
Witnesses:
E. R. Barrett
L. M. Spencer
Inventor
Edward B. Keith
By Edward N. Pagelsen,
Atty.

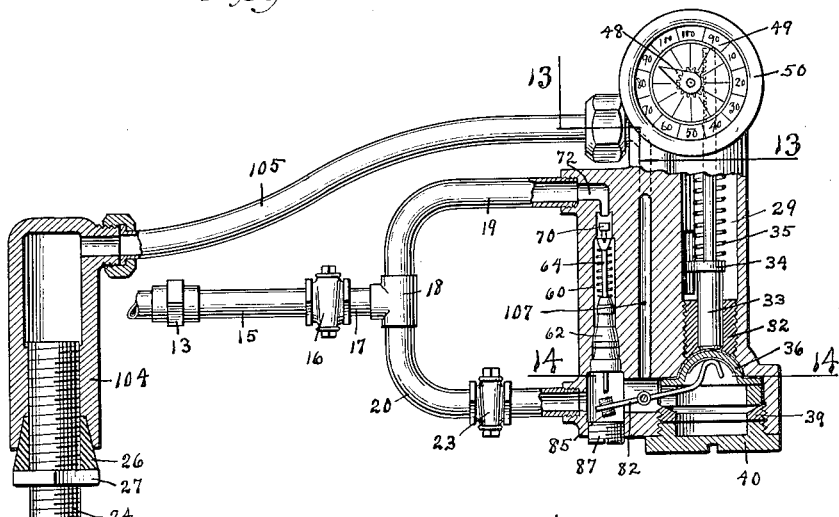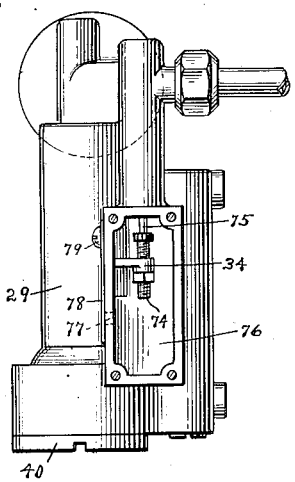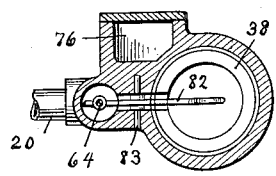

UNITED STATES PATENT OFFICE.

EDWARD B. KEITH, OF PONTIAC, MICHIGAN, ASSIGNOR OF ONE-HALF TO JOHN WATCHPOCKET, OF PONTIAC, MICHIGAN.

PRESSURE-CONTROLLER FOR TIRES.

1,128,455.  Specification of Letters Patent.  Patented Feb. 16, 1915.

Application filed March 19, 1914. Serial No. 825,872.

*To all whom it may concern:*

Be it known that I, EDWARD B. KEITH, a citizen of the United States, and a resident of Pontiac, in the county of Oakland and State of Michigan, have invented a new and Improved Pressure-Controller for Tires, of which the following is a specification.

This invention relates to means for insuring a practically even pressure in the tires of vehicle wheels, and its object is to provide a simple and efficient pressure controlling device which will permit the discharge of air from the tire to which it is attached whenever a predetermined pressure is exceeded, and which will permit the entrance of air when the pressure falls below a certain predetermined amount.

This invention consists, in combination with a tire tube and a storage reservoir, of a novel combined safety valve and pressure indicator formed with a passage through which air may be discharged from the tire tube, and with a second passage through which air may pass to said tire tube, the passage from the tire tube being opened by a rod which is normally held inoperative by a proper spring.

It further consists, in combination with a safety valve and pressure indicator as set forth of a valve for admitting air from the storage reservoir to the tire whenever the pressure in the tire falls below a predetermined tension.

Figure 1:
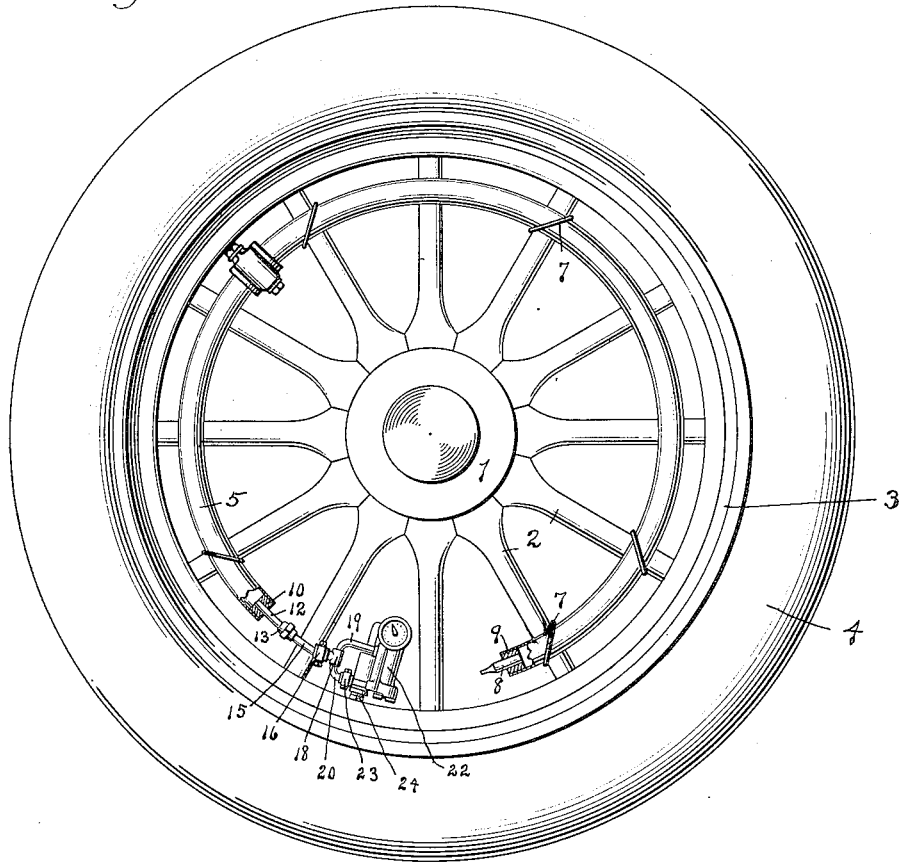
Figure 2:
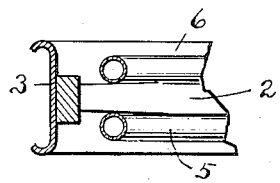

In the accompanying drawings, Figure 1 is an elevation of a vehicle wheel provided with my improved device. Fig. 2, is a transverse section of the rim of the wheel and storage reservoirs. Fig. 3 is a front elevation of the controller. Fig. 4 is a rear elevation with a part of the case broken away. Fig. 5 is a section on the line 5—5 of Fig. 4. Fig. 6 is a view showing the pressure indicator and relief valve. Fig. 7 is a section on the line 7—7 of Fig. 4. Fig. 8 is a section of the line 8—8 of Fig. 5 on a larger scale. Fig. 9 is a detail of a modified construction of the parts shown in Fig. 8. Fig. 10 is a perspective of the pressure indicating mechanism. Fig. 11 is a vertical section of a modified form of controller. Fig. 12 is a rear elevation of the same. Figs. 13 and 14 are sections on the lines 13—13 and 14—14 of Fig. 11, respectively.

Similar reference characters refer to like parts throughout the several views.

The hub 1, spokes 2, rim 3 and tire 4 shown in Fig. 1 may be of any desired construction. To the spokes may be secured the reservoirs 5 and 6, of any desired form, tubes preferred, clevises 7 being shown holding the tube in position. The reservoirs may be filled with highly compressed air by any desired means connected to a well known tire-valve 8, or similar device, conventionally shown in Fig. 1, mounted in the plug 9 in one end of the tube. The other end of the reservoir 5 may be fitted with a plug 10 into which a pipe 12 connects, which pipe also connects into a union 13 or any other desired form of connector. The reservoir 6 may be connected to the reservoir 5 or be merely carried as a reserve source of air under pressure. A pipe 15 extends from the union 13 to the valve or stop-cock 16, and a nipple 17 connects to a T 18. From this two tubes 19 and 20 extend to the body 22, the tube 20 being provided with a stopcock 23, which under normal conditions is kept closed, being opened when a large amount of air is desired, as when a repaired or new tire is to be filled. A tire-tube 24 of usual construction screws into the body 22, a tapering socket 25 receiving a tapering rubber washer 26, held in position by the nut 27. The body of the controller is formed with four chambers, all vertical and parallel to each other. One chamber 28 receives the tire tube, a second chamber receives the control spring and pressure indicator, a third chamber the relief valve, and a fourth chamber the valve to admit air from the reservoir to the tire. These chambers may be constructed and arranged in various ways, and it is not necessary that they are all in the same body.

Referring now to Fig. 4, it will be noticed that the chamber 28 communicates with the diaphragm end of the control chamber 29, by means of a passage 30, so that the pressure below the diaphragm will always be that in the tire.

Referring to Fig. 8 which is on a larger scale, the chamber 29 is shown to be partially plugged by means of the bushing 32, which is a guide for the operating rod 33, having an arm 34 against which the spring 35 engages to force the rod against the diaphragm 36 of rubber, leather or other suitable material. The bore of the lower end of this chamber is sufficiently large to furnish a shoulder 37, against which this diaphragm may be pressed by means of the washers 38 and 39 and the plug 40. The washer 38 has a circumferential groove 42 with which the passage 30 may communicate, and a slot 43 through which the air in the groove can enter the space beneath the diaphragm. At the upper end of the chamber 29, Fig. 6, is a dial chamber 45 having a graduated dial 46, an indicator shaft 47, a hand 48 thereon, a disk 49 of glass or other transparent material, a ring 50 to hold the disk in position, and a small pinion 53 on the shaft 47, that meshes with the rack teeth 52 on the upper end of the rod 33. As the pressure in the tire increases, the rod 33 will be forced up by the diaphragm, and the shaft 47 will be turned so that the hand 48 will indicate the pressure. The chamber 28 communicates with the top of the valve chamber 55, by means of a passage 56. A well known relief valve 57 in this chamber is constructed in the same manner as the valve shown in Fig. 8. A bushing 59 is screwed into the chamber 60 and has a revoluble engagement with the sleeve 61, which carries a packing washer 62, and has a valve seat 63 at its upper end. Secured to the valve rod 64 is a valve 65, and loose therein is a spring 66 and a cup shaped abutment 67 that engages the shoulder 68 at the upper end of the chamber 60. The spring normally holds the valve 65 onto the seat 63. In Fig. 8, a small valve 70 is mounted on the upper end of the rod 64, which valve is adapted to be pressed against the seat 71 at the end of the passage 72, as will be explained later.

Referring again to Figs. 4, 6 and 7, it will be noticed that the arm 34 on the rod 33, carries a headed adjustable screw 74, which is positioned so it will engage the lower end of the valve rod 75 of the valve 57 when the diaphragm 36 has been pushed upward by a predetermined pressure. This will permit the escape of the compressed air from the chamber 55, passage 56, chamber 28 and the tire, into the lower enlarged end 76 of the chamber 55 from whence it may pass out through the small opening 77, that is normally closed by the thin metal plate 78, held in place by a screw 79. When the pressure is too high in the tire, the diaphragm 36 will be forced upward, and when the pressure falls the spring 35 will force down the diaphragm. Adjacent the chamber 29 in which the rod 33 is mounted is the chamber 60 in which is mounted the valve just described. In the passage 82 between the lower ends of these chambers is a pivot 83 on which is mounted a lever 84 of stiff but resilient material. An adjustable contact 85 on one arm of this lever is adapted to engage with the lower end of the valve rod 64 when the diaphragm 36 has forced down the other end of the lever a predetermined distance, a cup shaped shield 86 being mounted between the lever and the diaphragm to prevent cutting of the latter. A plug 87 may be employed to close the lower end of the chamber 60. The distance between the contact 85 and the lower end of the valve stem 64, when the diaphragm is at its highest point, will determine the difference between the maximum and minimum pressures in the tire. When the pressure becomes too great, which occurs when the tire becomes hot, the rod 33 rises and opens the valve 57 and permits the escape of a portion of the air in the tire. When the pressure falls, the lever 84 lifts the valve 65 from its seat and permits the compressed air to pass from the reservoir through the pipe 19, passage 72, chamber 60, passage 82, lower end of chamber 29, passage 30 and chamber 28 to the tire until the pressure is sufficient to again lift the diaphragm. Should the tire burst, the pressure will escape very quickly and the diaphragm will descend sufficiently to force the valve 70 at the upper end of the valve rod 64 against its seat 71, thus preventing the escape of the air in the reservoir. As this movement of the diaphragm might bend the lever 84, it should be of resilient material. After the tire is repaired or replaced, the valve 23 in the pipe 20 is opened to permit air from the reservoir to fill the tire until the desired pressure is attained, after which this valve is again closed. Instead of a valve 70 at the upper end of the rod 64, a second valve such as shown in Fig. 9 may be employed. Here a bushing 90, washer 91, valve seat 92, valve stem 93, valve 94, spring 95 and abutment 96 are again employed, the spring 95 being somewhat weaker than the spring 64. A rod 97 extends across the small chamber 98 and carries a lever 101 whose ends engage between the collars 99 on the rod 64 and collars 100 on the rod 93. When the valve 65 is suddenly lifted an extreme distance, the lever 101 will permit the spring 95 to seat the valve 94 and prevent further flow of air through the pipe.

In the modified form shown in Figs. 11 to 14 inclusive, the chamber 28 is replaced by a separate chamber 104 into which the tire tube 24 extends, the tapering washer 26 being again employed. A pipe 105 connects to the chamber 104 and to the case, a passage 106 connecting to the upper end of the usual chamber 55, shown in Fig. 4, which is provided with a relief valve operated by the arm, 34. A passage 107 connects the upper end of the chamber 55 with the lower end of the diaphragm chamber, so that the pressure below the diaphragm will always be the same as in the tire. The lever 82 and the valve for admitting air from the reservoir are the same as shown in Fig. 8, and operate in the same manner. This construction is of advantage when the valve body cannot be mounted directly upon the tire tube. In all of these devices, the maximum and minimum of pressure in the tire is determined by the spring 35. When a vehicle first starts off, the tires are cold and the pressure is liable to be low. If too low, the valve 65 will permit a sufficient amount to flow from the reservoir. When the tire becomes hot, the air expands and the pressure increases, but as soon as it becomes too high, it will be released until no more than the predetermined pressure remains. The tire will therefore never have too much or too little pressure. The reservoir can be easily made to with-stand great pressure, so that a large supply of air can be carried.

The details of construction of the controlling device can all be changed to render it more compact if desired, without departing from the spirit of my invention as expressed in the following claims.

I claim:

1. In a pressure controlling device for tires, the combination of a chamber having a passage connecting to a vehicle tire, a second chamber adjacent the first and connected thereto by an air passage, a diaphragm mounted therein, a rod longitudinally slidable in the chamber, a spring to hold one end of the rod against the diaphragm on the opposite side from the passage connecting the chambers, an indicator connected to the rod, a relief valve mounted in a passage connecting to the first named chamber and adapted to be operated by the rod when the pressure on the diaphragm reaches a predetermined amount, and a connection between the device and a source of air under pressure.

2. In a pressure controlling device for vehicle tires, the combination of a body consisting of a series of chambers connected to each other by passages, a valve in the passage between the first and third chambers, a diaphragm in the second chamber adapted to be moved by the air pressure in the first chamber, means operated by said diaphragm to operate the valve when the pressure in the chambers exceeds a certain amount, a connection between the first chamber and a vehicle tire, and a connection between the device and a source of air under predetermined pressure.

3. In a controlling device for vehicle tires, the combination of a body consisting of a series of chambers, the first chamber connecting to the top of the third and to the bottom of the second by air passages, a valve in the passage to the third chamber, a diaphragm in the second chamber above the passage adapted to be moved up by the air pressure in the passage, a rod actuated by the diaphragm to unseat said valve when the pressure below the diaphragm exceeds a predetermined amount, and connections between the first named chamber and a vehicle tire and with a source of air under pressure.

4. In a controlling device for vehicle tires, the combination of a body constituting a series of chambers, the first chamber connecting to the top of the third and to the bottom of the second by air passages, a valve in the passage to the third chamber, a diaphragm in the second chamber above the passage thereto and adapted to be moved by the air pressure in the passage, a spring held rod actuated by the diaphragm to unseat the valve when the pressure on the diaphragm from the air passage exceeds a predetermined amount, a tire tube connecting to the first chamber, a tubular reservoir of air under pressure, a connection between said reservoir and the device, and means for controlling the pressure of the air entering said device.

5. In a controlling device for vehicle tires, the combination of a body consisting of a series of chambers, the first chamber connecting to the top of the third and to the bottom of the second by air passages, a valve in the passage to the third chamber, a diaphragm in the second chamber above the passage adapted to be moved up by the air pressure in the passage, a rod actuated by the diaphragm to unseat said valve when the pressure below the diaphragm exceeds a predetermined amount, and connections between the first named chamber and a vehicle tire and between the device and a source of air under pressure, said connection between said chamber and tire including a tire tube, a tapering rubber washer therein and fitting into a tapering entrance to said chamber, and a nut to hold the washer in position.

6. In a pressure controlling device for tires, the combination of a chamber having a passage connecting to a vehicle tire, a second and third chamber adjacent the first and connected thereto by passages extending to the bottom of the second and top of the third chamber, a diaphragm mounted in the second chamber above its passage, a longitudinally slidable rod in engagement with the diaphragm, a spring to press the rod and diaphragm against the pressure of air from the first chamber, a pressure indicator connected to the rod, a relief valve mounted in the passage to the third chamber, and means in the third chamber connected to said rod whereby the valve is opened to release the air in the chambers when it reaches a predetermined pressure.

7. In a pressure controlling device for vehicle tires the combination with a body and a spring mounted therein, a rod actuated by the spring, means actuated by the pressure of the air within the tire for moving the rod against the tension of the spring, a valve actuated by said rod when at one predetermined position to admit compressed air to the tire, and a second valve actuated by said rod when at a second predetermined position to permit the escape of air from the tire.

8. In a pressure controlling device for vehicle tires, the combination with a body connected to a tire and to a source of air under pressure, a relief valve to permit the escape of air from the tire, a supply valve to permit the passage of air from said source to said tire, a rod movable in one direction by the pressure of air in the tire, and a spring to move the rod in the opposite direction, said rod adapted to open the supply valve when the pressure in the tire falls below a predetermined amount and to open the relief valve when the pressure exceeds a predetermined amount.

9. In a pressure controlling device for vehicle tires, the combination with a body adapted to be connected to the tire tube and to a source of air under pressure, a valve to permit the escape of air from the tire, a second valve to permit the passage of air from the source of air under pressure to the tire, and a spring-tensioned controlling device actuated by the pressure of air in the tire for operating the valves to permit air to enter the tire or escape therefrom when the air therein is below or above predetermined pressure respectively.

10. In a pressure controlling device for vehicle tires, the combination with a body connected to a tire and to a source of air under pressure, a relief valve to permit the escape of air from the tire, a supply valve to permit the passage of air from the source of air under pressure to the tire, a rod movable in one direction by the pressure of the air in the tire to open the relief valve when the air in the tire is above a predetermined pressure, a spring to move the rod to open the supply valve when the air in the tire falls below a predetermined pressure, and means connected to said rod for indicating the pressure in the tire.

11. In a pressure controlling device for vehicle tires, the combination with a body connected to a vehicle tire and to a source of air under pressure, means controlled by the pressure in the tire for connecting the tire to the atmosphere when the air therein is above a predetermined pressure, and means for connecting the tire with the source of air under pressure when the air in the tire is below a predetermined pressure, said means comprising a spring-tensioned member operated by the pressure of the air in the tire for actuating said means.

12. In a pressure controlling device for vehicle tires, the combination with a body and a spring mounted therein, a rod movable in one direction by the spring, means actuated by the pressure of the air within the tire for moving the rod against the tension of the spring, a valve operated by said rod when the air in the tire is below a predetermined pressure to admit compressed air to the tire, a second valve operated by said rod to permit air to escape from the tire when it is above a predetermined pressure, and a third valve to close the passage to said source of compressed air when pressure above atmospheric in the tire ceases.

In testimony whereof, I have signed this application in the presence of two subscribing witnesses.

EDWARD B. KEITH.

Witnesses:
 EDWARD N. PAGELSEN,
 HUGO W. KREINBRING.